March 10, 1942.    A. SLATEN    2,275,566
BUTTER CUTTING MACHINE
Filed June 12, 1939    3 Sheets-Sheet 1
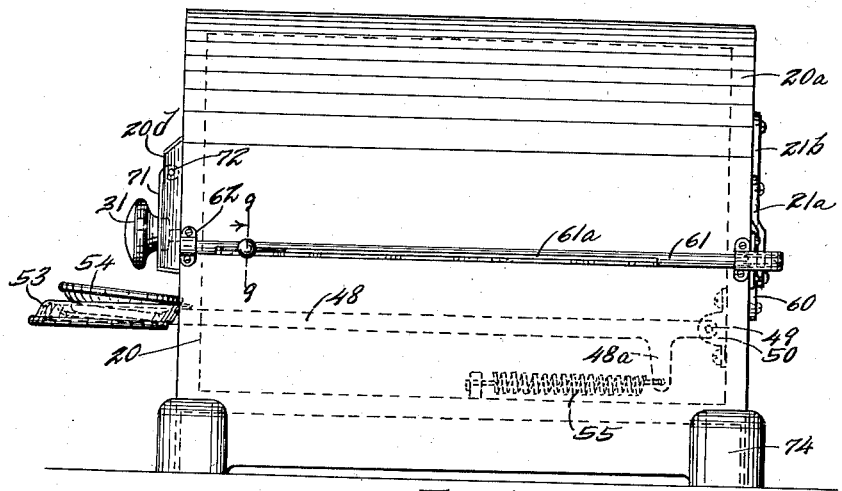
Fig. 1.
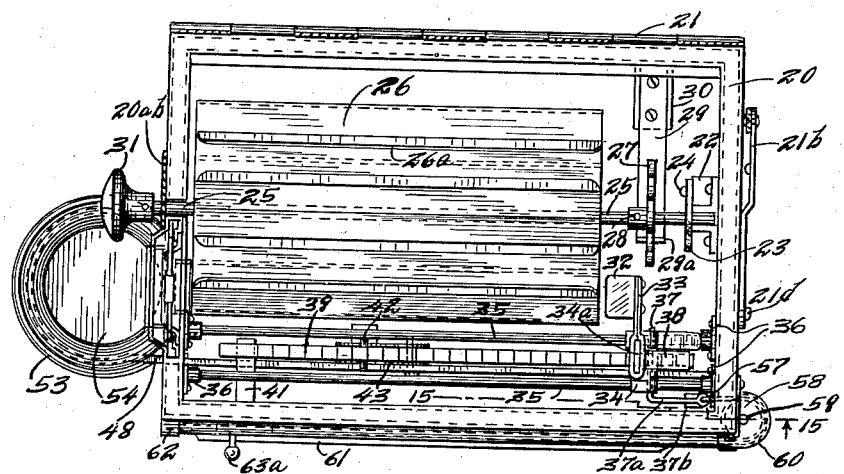
Fig. 2.
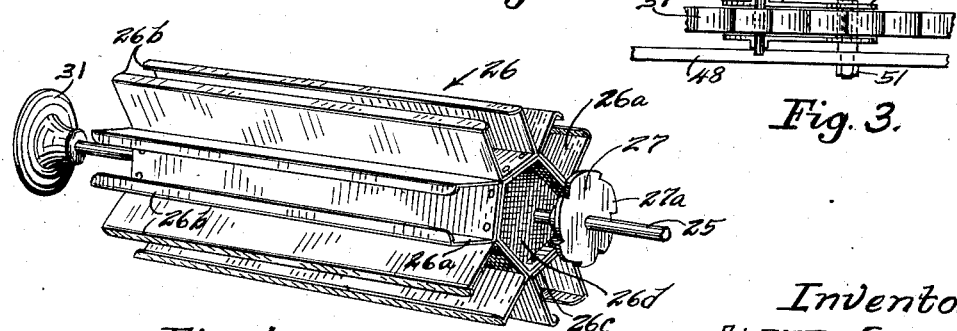
Fig. 3.
Fig. 4.
Inventor
ALBERT SLATEN
By Chas L. Reif.
Attorney March 10, 1942.  A. SLATEN  2,275,566
BUTTER CUTTING MACHINE
Filed June 12, 1939  3 Sheets-Sheet 2

Inventor
ALBERT SLATEN
By Chas. C. Reif
Attorney

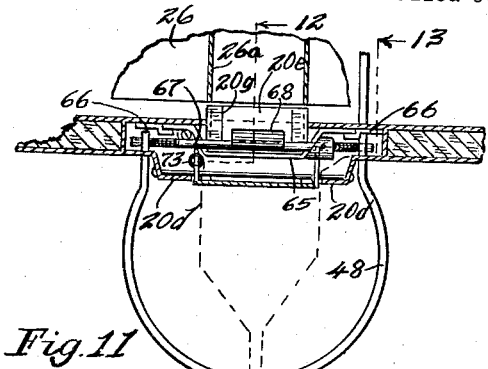
Fig. 11.
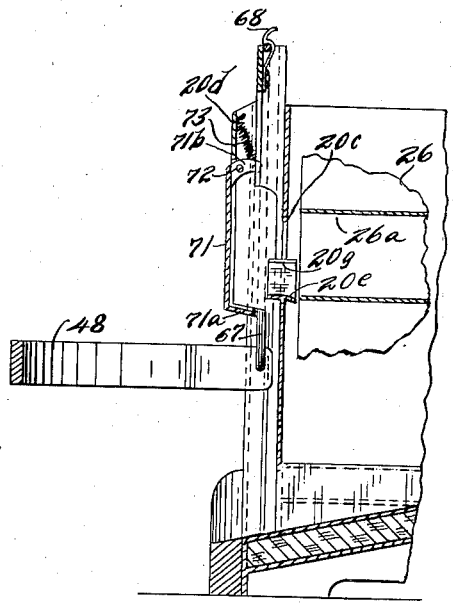
Fig. 12.
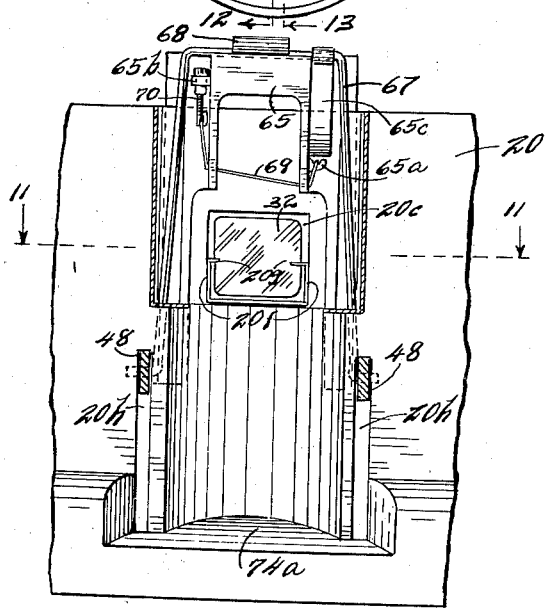
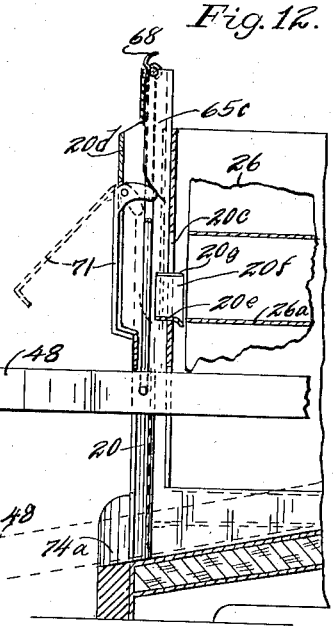
Fig. 13.
Fig. 14.
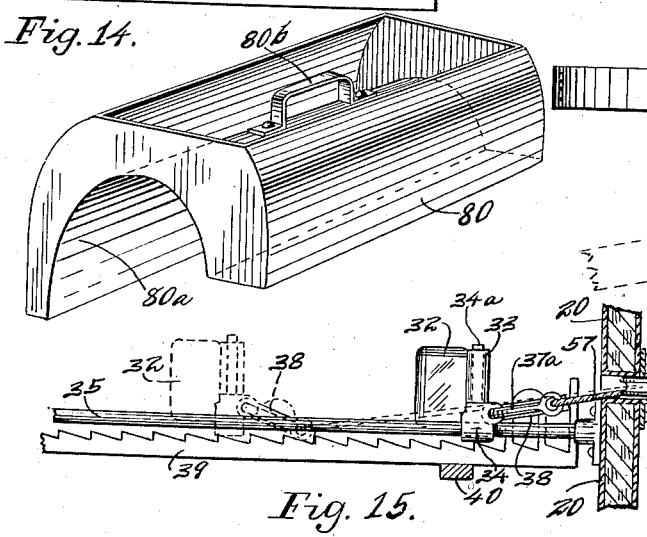
Fig. 15.
Inventor
ALBERT SLATEN
Attorney Patented Mar. 10, 1942

2,275,566

UNITED STATES PATENT OFFICE 2,275,566

BUTTER CUTTING MACHINE

Albert Slaten, Minneapolis, Minn.

Application June 12, 1939, Serial No. 278,615

7 Claims. (Cl. 31—20)

This invention relates to a butter cutting machine. It is desired by many hotels, restaurants and other places to have butter cut into comparatively thin rectangular pieces for serving. Butter is generally supplied to such institutions in pound packages either in one or several pieces. It is now common to serve a pound package which is divided into four elongated pieces rectangular in cross section which may be cut into the desired pieces for serving.

It is an object of this invention to provide a butter cutting machine of extremely simple form, one which can be sold at a comparatively low price and which is quite efficient in operation.

It is another object of the invention to provide a butter cutting machine comprising a casing having a butter holding magazine therein, a tray at one end of and without said casing adapted to receive a butter dish and mechanism actuated by depression of said tray by the operator for feeding and cutting butter carried in said magazine and delivering the cut pieces into a dish carried on said tray.

It is also an object of this invention to provide a butter cutting machine having a casing, a cover for said casing which may be open and a rotatable magazine disposed in said casing comprising radially arranged compartments, said magazine being readily removable from said casing when said cover is open, so that said magazine may be loaded outside of said casing.

It is still another object of the invention to provide a butter cutting machine comprising a casing having an opening at one end for the delivery of cut pieces of butter, a tray disposed below said opening adapted to receive a butter dish, a lever having one end connected to said tray and pivoted adjacent the other end of said casing, a butter feeding mechanism, a butter cutting mechanism, said tray and lever being depressible by the operator for actuating said butter feeding and butter cutting mechanisms.

These and other objects and advantages of the invention will be fully set forth in the following description made in connection with the accompanying drawings in which like reference characters refer to similar parts throughout the several views and in which—

Fig. 1 is a view in side elevation of the device;

Fig. 2 is a top plan view of the device with the cover removed;

Fig. 3 is a partial plan view on an enlarged scale;

Fig. 4 is a perspective view of the magazine removed from the machine;

Fig. 11 is a horizontal section taken substantially on line 11—11 of Fig. 14 as indicated by the arrows;

Fig. 12 is a vertical section taken substantially on line 12—12 of Fig. 11 as indicated by the arrows;

Fig. 13 is a vertical section taken substantially on line 13—13 of Fig. 11 as indicated by the arrows;

Fig. 14 is a perspective view of a cooling or refrigerating device used; and

Fig. 15 is a partial vertical section taken substantially on line 15—15 of Fig. 2 as indicated by the arrow.

Figures 8, 10:
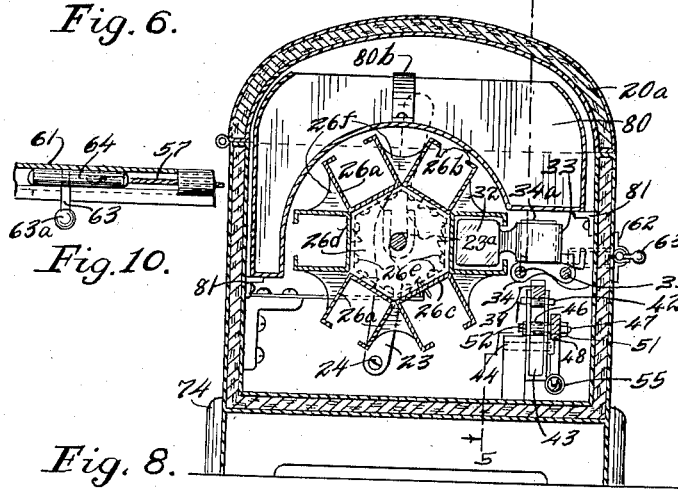
Fig. 8 is a vertical section taken substantially on line 8—8 of Fig. 5 as indicated by the arrow.
Fig. 10 is a horizontal section taken substantially on line 10—10 of Fig. 9 as indicated by the arrow.
Figure 9:
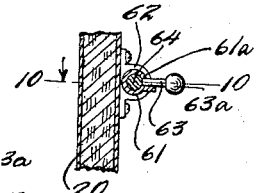
Fig. 9 is a vertical section taken substantially on line 9—9 of Fig. 1 as indicated by the arrow.

Referring to the drawings, a butter cutting machine is shown comprising a casing 20. While this casing might be variously formed, in the embodiment of the invention illustrated it is shown as rectangular in horizontal and vertical cross section, the same having a cover or lid 20a of rounded form fitting on the top thereof and hinged thereto along one side by hinge 21. Lid or cover 20a can be held in raised position by means of a pair of toggle links 21a and 21b. Link 21a has a depression 21c therein into which the head of a screw 21d snaps or engages when the toggle link is straightened with the cover in open position. The toggle can be easily broken by hand to close the cover. The walls of casing 20 and cover 20a are preferably formed of spaced layers of sheet material such as metal between which will be disposed some material forming a good insulator, such as cork. Bearings are provided adjacent the ends of casing 20, one of which is formed by a small bracket 22 bolted to the inner side of said casing. The bearing in bracket 22 is open at its upper side. A latch member 23 is pivotally secured to the inner side of bearing 22 by a pivot screw 24 which is adapted to swing over and hold in place a shaft 25 receivable in said bearings. As shown in Fig. 8 member 23 has a projection 23a thereon which overlies shaft 25. Member 23 extends substantially vertically and the upper end is formed as a handle. The other bearing referred to is formed at the bottom of a slot 20b formed in the end of casing 20. A magazine 26 is secured to and carried by shaft 25 between said bearings. Magazine 26 is shown as comprising a plurality of compartments 26a which are rectangular in cross section, each having its outer side open between small flanges 26b which extend parallel to the inner side 26c of each compartment. Said inner sides 26c are arranged to form a regular polygon. Said compartments may be secured to plates 26d at each end of said magazine by rivets 26e. Small ribs 26f are also shown as extending between the sides of adjacent compartments 26a. A ratchet wheel 27 is secured to shaft 25 as by the pin 28 shown, said ratchet wheel having teeth 27a equal in number to the compartments 26a. A pawl 29 formed of a spring plate has an end 29a adapted to engage the faces of teeth 27a and hold the magazine 26 in one position. Pawl 29 is secured to a block 30 secured to the bottom of casing 20. A knob handle 31 is secured to shaft 25 at the outer side of the casing adjacent slot 20b. Magazine 26 can be rotated and brought into different positions in engagement with pawl 29 by turning knob 31. The magazine together with shaft 25, ratchet wheel 27 and knob 31 can be bodily removed from the casing when lid or cover 20a is in open position. The magazine can thus be loaded outside of the casing.

A butter feeding mechanism is provided and this comprises a plunger member or block 32 of slightly smaller area than the cross section of one of the compartments 26a. Block 32 is adapted to move in said compartments respectively as shown in Fig. 8. Block 32 has a bracket 33 secured thereto, the same having a vertical slot therethrough adapted to receive the upstanding portion 34a of a bracket 34. Bracket 34 has openings through which pass a pair of guide rods 35, said rods being secured at their ends in small brackets 36 secured to the inner sides of the end walls of casing 20. Bracket 34 has pivoted thereto on a pivot or pintle 37, a pawl member 38. Pawl member 38 is thus swingable vertically and drops by gravity into engagement with a rack 39. Rack 39 is removably carried in guide brackets 40 and 41 having slots therein in which said rack fits, said slots being open at their upper sides. Rack 39 has secured therein a pin 42 which projects at opposite sides of said rack and is received in slots 43a formed in the top of a cam 43. Said cam is shown as comprising spaced plates, one of which is disposed at either side of said rack. Cam 43 is pivotally mounted on a pivot 44 projecting therethrough and carried in a post or bracket 45 secured to the bottom of casing 20. Cam 43 has an opening 43b therethrough with which cooperates a cam roller 46 carried on a pin or stud 47 secured in a lever bar 48 extending longitudinally of casing 20 and pivoted at one end on a pivot member 49 carried in a bracket 50 secured to one end of casing 20. Stud 47 is shown as having a nut 51 thereon at one side of bar 48 and cam roller 46 is held on said stud by a pin 52.

Bar 48 projects through openings 20h in the end of casing 20 and has a tray 53 secured at said end without casing 20 which is adapted to receive a butter dish 54. Lever bar 48 has a downwardly extending projection 48a to the lower end of which is secured one end of a tensile coiled spring 55, the other end of which is secured to a small bracket 56 secured to the bottom of casing 20. Rack 39 has the teeth 39a at one end thereof of increased height for a purpose to be later described. The pivot member 37 to which pawl 38 is secured projects at one side of the bracket 34 to form an arm 37a which has an eyelet at its end to which is secured a cord or very flexible cable 57. The end of arm 37a is also provided with the weight 37b so that the end of said arm tends to fall by gravity. Cord or cable 57 extends through an opening in the end of casing 20 and runs around a small pulley 58 journaled on a stud 59 extending through and secured in a small bracket 60 secured to the end of casing 20. A tube 61 has one end secured in bracket 60 and its other end secured in a bracket 62 secured adjacent the other end of casing 20 as shown in Fig. 1. Said tube 61 extends along the outer side of casing 20. Tube 61 is provided with a slot 61a in the side thereof through which projects a pin 63 having a ball 63a secured to its outer end and forming a handle. Pin 63 at its inner end is secured in a plunger 64 which slides in tube 61 and to which one end of cord or cable 57 is secured.

A butter cutting mechanism is provided comprising a vertically movable cross head 65 having side portions guided in brackets 66 secured within the end wall of casing 20. A bail 67 extends over the top of cross head 65 and through a groove in said top. A spring catch 68 secured to cross head 65 is adapted to spring over the top of bail 67 to hold the same in place. Bail 67 has downwardly and outwardly extending arms which have their lower ends bent substantially at right angles to extend through holes formed in bar 48, which bar as shown in Figs. 2, 11 and 13 extends from casing 20 and is bent into semicircular shape, the same forming the support for tray 53. Cross head 65 has a wire 69 extending across a substantially rectangular opening therein, one end of said wire being secured over a small hook projection 65a on said cross head and the other end being secured to one end of an adjusting screw 70 threaded in a lug 65b projecting from one side of cross head 65. Wire 69 is shown as extending at a slight angle to the horizontal where it crosses the opening in cross head 65.

Figure 5:
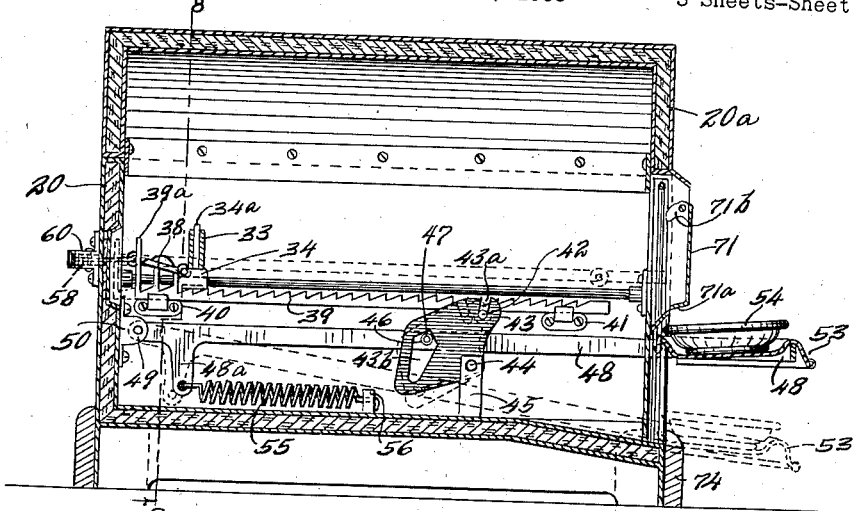
Fig. 5 is a vertical section taken substantially on line 5—5 of Fig. 8 as indicated by the arrow.
Figures 6, 7:
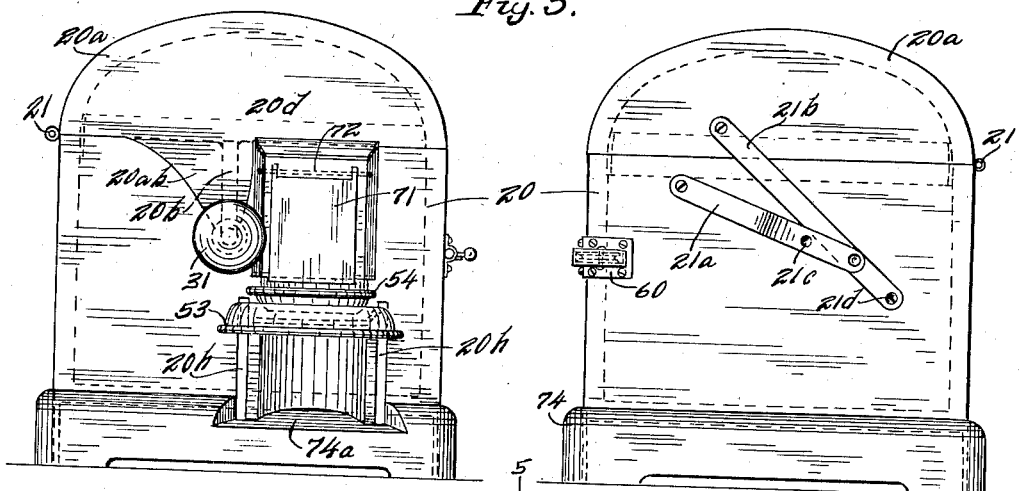
Fig. 6 is a view in end elevation of the machine.
Fig. 7 is a view in end elevation showing the end of the machine opposite that shown in Fig. 6.

Cross head 65 is adapted to aline with an opening 20c in the end wall of casing 20 and with which the compartments 26a successively aline. Plunger member 32 thus also alines with said opening. A door 71 having a lower flange 71a extends over opening 20c and is hinged adjacent its upper end on pintle 72. Said door at its upper end has an inwardly extending hook-like projection 71b to the inner end of which is secured the lower end of a tensile coiled spring 73, the upper end of which is secured to a stationary portion 20d of casing 20 which extends outwardly about cross head 65 which also has opening 20c therethrough. Cross head 65 has carried thereon in alinement with portion 71b a cam 65c adapted to engage said portion and swing door 71 outwardly as shown in dotted lines in Fig. 13 against the tension of spring 73. It will be noted as shown in Figs. 11, 12 and 13 that casing 20 has a substantially horizontal portion 20e which extends inwardly adjacent the end of magazine 26. Side portions 20f extend upwardly from portion 20e and have inwardly projecting quite thin flanges 20g at their ends which project toward each other. As shown in Figs. 5, 6, 12, 13 and 14, the bottom wall of casing 20 slopes downwardly below opening 20c. Said casing has a molding 74 extending thereabout and said molding is cut away in alinement with said downwardly sloping portion to have a top surface flush with the top of said portion, thus forming a recess 74a in said molding. The openings through which lever bar 48 projects are shown in Fig. 6 as 20h.

It will be noted that cover 20a has a downwardly extending portion 20ab which covers slot 20b and extends substantially to shaft 25.

A cooling or refrigerating receptacle 80 is provided shown in Fig. 14. This comprises a receptacle made of sheet material such as metal and being of semi-annular form. The same has an inner substantially semi-cylindrical surface or side 80a which is adapted to closely surround the magazine 26. Said receptacle has an open top and horizontal bottom portions at either side which rest on brackets 81 secured to the inner sides of the side walls of casing 20. Said receptacle 80 is provided with a handle 80b.

In operation, the cover 20a will be opened and the magazine 26 as shown in Fig. 4 removed. The magazine can then be loaded, a block of butter being disposed in each of the compartments 26a. Such elongated pieces or blocks of butter may be the pieces now commonly retailed as quarter pounds. In some establishments it may be desired to have several of the magazines. These can be loaded and kept in refrigerators until it is desired to use them in the machine. The loaded magazine is placed in the casing 20 and the cover can be closed. It is desirable to place finely divided ice or other refrigerant in the casing 80. This will keep the butter in the magazine in the desired solid condition. When the machine is to be thus started, the operator moves the handle 63 and 63a to the left to the limit of its movement as shown in Fig. 1. This pulls member 34 to its extreme right hand position as shown in Fig. 15 or to the left hand position as shown in Fig. 5. The bracket 58 is placed above the top of rack 39 so that when arm 37a and pawl 38 are pulled to their extreme end positions they will be lifted, thus moving over the teeth of said rack. A small butter dish 54 is now placed on tray 53. The operator now depresses tray 53 thus swinging lever 48 about its pivot 49 against the tension of spring 55. This moves roller 46 downwardly against one side of opening 43b in cam 43 so that said cam is oscillated about its pivot. This moves rack 39 to the left as shown in Fig. 5 through the connection of pin 42 with cam 43. As the lever 48 is pulled downwardly it pulls downward the cross head 65 through the bail 67. The wire 69 thus moves through the end of the block of butter. It will be understood that the said end at the beginning of the operation is projecting beyond wire 69, the distance corresponding to the thickness of the desired cut piece. The piece of butter is thus cleanly severed by wire 69. As cross head 65 descended cam 65c acted on projection 71b swung open the door 71. The piece of butter thus swings outwardly and drops into the dish 54. When the operator releases tray 53 spring 55 moves the same and lever 48 to its upper position. After the lever has moved upward a certain distance so that wire 69 is out of alinement with opening 20c, cam roller 46 acts on the upper inclined side of opening 43b and swings cam 43 to its full line position as seen in Fig. 5. The rack is now moved to the right, and, as said rack thus moves, one of its teeth engages pawl 38 and moves said pawl so that bracket 34 and plunger 32 are moved with the rack substantially the distance of the length of one of the rack teeth. Plunger 32 thus pushes forward the block of butter in the compartment 26a and the end of said block is thus projected the proper distance beyond the plane of wire 69 so that when lever 48 is again depressed it will be severed. The end teeth 39a on rack 39 are made of extra height for the reason that arm 38 would not drop down sufficiently to engage the teeth in the first three operations if they were of the normal height. This is due to the fact that the end of the arm is held up by cable 57 until there is sufficient slack in said cable for weight 37b to lower arm 37a sufficiently for pawl 38 to engage the rack. It will be understood that when cross head 65 is raised spring 73 closes the door 71. The above operation is repeated by the operator's successively pushing down on tray 53. At each of said operations a piece of butter is severed and drops down into a dish 54. Preferably only one cut piece is delivered into each dish. The portions 20g are provided to give an additional support for the piece of butter when it has reached its smallest thickness before the last cut. These members prevent the piece of butter from being mashed down and insure that a proper rectangular piece will be cut and delivered. The tension of wire 69 can be maintained at the proper degree by the adjusting screw 70. The rack 39 is made readily removable. The length of the teeth on the rack determines the thickness of the cut pieces of butter. Some establishments prefer one thickness and other establishments prefer a different thickness. The proper rack can be used to give the desired thickness. When plunger 32 has expelled or projected all of the block of butter the operator again takes hold of handle 63 and 63a and slides plunger 64 to the left as shown in Fig. 1 to the limit of its movement. When the block of butter in one compartment has been cut and delivered the operator turns knob handle 31 to bring the next compartment into alinement with opening 20c. The magazine is held by the pawl 29 and the operator successively depresses tray 53 until the block of butter has been all cut. The operation is repeated until all the butter in the magazine has been cut and delivered. The plunger 32 with its bracket 33 is made readily removable so that it can be easily washed or cleaned. The refrigerating casing 80 can be readily lifted from the casing when cover 20a is in open position.

From the above description it will be seen that I have provided a very simple and yet very efficient butter cutting device. The pieces of butter to be served are cleanly severed and are placed in the serving dishes without being touched by the operator. The butter propelling means and the butter cutting means are both operated from the one lever 48 which is actuated by the operator's depressing the tray 53. The mechanism and operation are thus both quite simple. The walls of the casing being made with insulating material therein and the refrigerating casing 80 being used, the butter is kept in firm and solid condition for being propelled and cut. It is unnecessary with this machine to have cut pieces of butter put in a dish with ice and water as is a common practice. Butter thus placed in water and ice loses its flavor and tastes flat. With the present machine the butter is kept firm until the cut piece is dropped on the serving dish. The butter retains its full and natural flavor and is very palatable. There is a marked difference in the taste and flavor of the butter cut in the present machine and butter cut by hand and kept in ice and water. The machine has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A butter cutting machine having in combination, a casing having an opening at one end, a tray at the outer side of said casing disposed below said opening and adapted to receive a butter dish, a lever within said casing having one end projecting therefrom and connected to said tray and pivoted adjacent the other end of said casing, a spring holding said lever in position with the tray end thereof elevated, a butter feeding mechanism including a pawl and a ratchet bar connected to and actuated from said lever, and a butter cutting mechanism adjacent said opening connected to and actuated from said lever, said tray constituting an operating element arranged to be depressed by the operator for operating said feeding and cutting mechanism.

2. A butter cutting machine having in combination, a casing having an opening at one end, a tray at the outer side of said casing disposed below said opening and adapted to receive a butter dish, a lever having one end connected to said tray and pivoted adjacent the other end of said casing, a spring holding said lever in position with the tray end thereof elevated, a rotatable magazine in said casing comprising a plurality of radially arranged compartments, said magazine being constructed and arranged to be positioned with one of said compartments in alinement with said opening, a plunger movable in said compartment for advancing a block of butter therein, a pawl secured to said plunger, a cutting mechanism adjacent said opening for cutting a piece of butter from said block, means connected to said lever including a ratchet bar for moving said pawl and a cam for moving said ratchet bar and actuated by said lever for advancing said plunger step by step, and means connected to said lever for operating said cutting mechanism, said tray forming an operating element and being depressible by the operator for actuating said means.

3. A butter cutting machine having in combination, a casing having an opening at one end, a tray at the outer side of said casing disposed below said opening and adapted to receive a butter dish, a lever within said casing and having one end projecting therefrom and connected to said tray and pivoted adjacent the other end of said casing, a spring holding said lever in position with the tray end thereof elevated, a rotatable magazine in said casing having a plurality of compartments, said magazine being constructed and arranged to be positioned with one of said compartments in alinement with said opening, a plunger movable into said compartment for advancing a block of butter therein, a swingable pawl secured to said plunger, a reciprocable rack with which said pawl engages to move said plunger step by step, and a cam connected to said rack and connected to and movable by said lever for reciprocating said rack, said tray forming an operating element depressible by the operator for actuating said means.

4. A butter cutting machine having in combination, a casing, a rotatable magazine in said casing comprising compartments substantially rectangular in cross section having inner flat sides, a polygonal supporting member for said compartments having sides engaged respectively by said flat sides, said compartments having openings extending longitudinally thereof at their sides opposite said flat sides, a plunger movable in one of said compartments when in a certain position in said casing, said plunger having a support extending through and movable in said opening, a pawl swingingly carried by said plunger, a ratchet bar reciprocable to engage said pawl and move said plunger step by step, a lever pivoted at one end adjacent one end of said casing and projecting from the other end of said casing, a cam connected to said ratchet bar, a cam roller carried on said lever at an intermediate portion thereof for operating said cam and a butter cutting means connected to and actuated by said lever.

5. A butter cutting machine having in combination, a casing having an opening at one end, a tray at the outer side of said casing disposed below said opening and adapted to receive a butter dish, a lever having one end connected to said tray and pivoted adjacent the other end of said casing, a spring holding said lever in position with the tray end thereof elevated, a rotatable magazine in said casing comprising a plurality of radially arranged compartments, said magazine being constructed and arranged to be positioned with one of said compartments in alinement with said opening, a plunger movable in said compartment for advancing a block of butter therein, a cutting mechanism adjacent said opening for cutting a piece of butter from said block, means connected to said lever for advancing said plunger step by step, means connected to said lever for operating said cutting mechanism, said tray forming an operating element and being depressible by the operator for actuating said means, a cable connected to said plunger, a guideway at the exterior of said casing having a member movable therein to which said cable is connected and a handle secured to said last mentioned member for moving said member in said guideway and retracting said plunger.

6. A butter cutting machine having in combination, a casing having an opening at one end, a tray at the outer side of said casing disposed below said opening and adapted to receive a butter dish, a lever having one end connected to said tray and pivoted adjacent the other end of said casing, a spring holding said lever in position with the tray end thereof elevated, a rotatable magazine in said casing having a plurality of compartments, said magazine being constructed and arranged to be positioned with one of said compartments in alinement with said opening, a plunger movable into said compartment for advancing a block of butter therein, a swingable pawl secured to said plunger, a reciprocable rack with which said pawl engages to move said plunger step by step, means connected to said lever for reciprocating said rack, said tray forming an operating element depressible by the operator for actuating said means, said casing having an opening in the end opposite said opening disposed some distance above said rack, an arm connected to and swingable with said pawl, a cable secured to said arm and passing through said last mentioned opening, a pulley at the end of said casing over which said cable passes, a guide member along the side of said casing, a member movable in said guide member to which said cable is secured and a handle secured to said last mentioned member for moving the same and said cable to lift said arm and pawl and retract said plunger after the latter has expelled said block of butter from said compartment.

7. The structure set forth in claim 6, several teeth on said rack adjacent said last mentioned opening being of progressively greater height than the other teeth of said rack, so as to be engaged by said pawl as said pawl is held above the normal height of said teeth by said arm due to said last mentioned opening being located above the normal height of said rack teeth.

ALBERT SLATEN.